US009843520B1

(12) United States Patent
Haltore et al.

(10) Patent No.: US 9,843,520 B1
(45) Date of Patent: Dec. 12, 2017

(54) TRANSPARENT NETWORK-SERVICES ELASTIC SCALE-OUT

(71) Applicant: Avi Networks, Sunnyvale, CA (US)

(72) Inventors: Kiron Haltore, San Jose, CA (US); Murali Basavaiah, Sunnyvale, CA (US); Ranganathan Rajagopalan, Fremont, CA (US)

(73) Assignee: Avi Networks, Santa Clara, CA (US)

( * ) Notice: Subject to any disclaimer, the term of this patent is extended or adjusted under 35 U.S.C. 154(b) by 233 days.

(21) Appl. No.: 14/295,218

(22) Filed: Jun. 3, 2014

Related U.S. Application Data

(60) Provisional application No. 61/866,481, filed on Aug. 15, 2013.

(51) Int. Cl.
*H04L 12/803* (2013.01)

(52) U.S. Cl.
CPC .................................. *H04L 47/125* (2013.01)

(58) Field of Classification Search
CPC ............ H04L 41/0893; H04L 41/0896; H04L 41/1008; H04L 41/1023; H04L 43/0876; H04L 45/00; H04L 45/16; H04L 45/24; H04L 45/38; H04L 45/74; H04L 45/745; H04L 47/10; H04L 47/22; H04L 47/122; H04L 47/125; H04L 47/2441; H04L 47/2483; H04L 47/41; H04L 47/76; H04L 47/781; H04L 47/803; H04L 67/1002; H04L 67/1029; H04L 67/288;

(Continued)

(56) References Cited

U.S. PATENT DOCUMENTS

| 6,750,897 | B1 * | 6/2004 | Moshrefi ................ | H04N 7/147 348/14.08 |
| 7,817,549 | B1 * | 10/2010 | Kasralikar ............ | H04L 43/026 370/232 |

(Continued)

OTHER PUBLICATIONS

Al-Fares et al., Hedera: dynamic flow scheduling for data center networks, Proceedings of the 7th USENIX conference on Networked systems design and implementation, Apr. 30, 2010.*

(Continued)

*Primary Examiner* — Benjamin H Elliott, IV
*Assistant Examiner* — Eric Nowlin
(74) *Attorney, Agent, or Firm* — Van Pelt, Yi & James LLP

(57) ABSTRACT

In a network with at least a first device already configured to provide a network service to a network application, scaling service capacity includes: configuring one or more second devices to provide the network service to the network application. In embodiments where an upstream network device supports Equal-Cost Multi-Path (ECMP) routing, the upstream network device is configured, including storing a plurality of paths to reach an address associated with a network application, wherein the plurality of paths are equal in cost. In embodiments where the upstream network device does not support ECMP routing, the second device is configured not to respond to an Address Resolution Protocol (ARP) request associated with an Internet Protocol (IP) address of the network application, and the first device is instructed to perform load balancing on network traffic destined for the network application among the first device and the one or more second devices.

33 Claims, 12 Drawing Sheets

(58) Field of Classification Search
CPC ..... H04L 49/70; H04L 63/0218; H04L 67/10; H04L 67/1008; H04L 67/101; H04L 67/1017; H04L 67/1023; H04L 67/1027; H04L 67/1031; H04L 67/1034; H04L 67/1038; H04L 67/1097; H04L 67/14; H04L 67/2842; H04W 28/08; H04W 28/10

See application file for complete search history.

(56) References Cited

U.S. PATENT DOCUMENTS

| | | | | |
|---|---|---|---|---|
| 7,940,766 | B2* | 5/2011 | Olakangil | H04L 12/1836 370/390 |
| 7,983,270 | B2* | 7/2011 | Wong | H04L 12/5601 370/395.31 |
| 8,018,852 | B2* | 9/2011 | Olakangil | H04L 45/00 370/229 |
| 8,103,750 | B2* | 1/2012 | O'Neal | H04L 45/02 709/220 |
| 8,462,774 | B2* | 6/2013 | Page | H04L 45/245 370/369 |
| 8,499,093 | B2* | 7/2013 | Grosser | H04L 61/103 370/392 |
| 8,755,283 | B2* | 6/2014 | Patel | H04L 47/125 370/236 |
| 8,812,727 | B1* | 8/2014 | Sorenson, III | H04L 47/70 709/219 |
| 8,972,602 | B2* | 3/2015 | Mithyantha | H04L 45/02 370/235 |
| 8,989,189 | B2* | 3/2015 | Zhang | H04L 12/4641 370/392 |
| 9,083,642 | B2* | 7/2015 | Janardhanan | H04L 45/586 |
| 9,509,614 | B2* | 11/2016 | Bosch | H04L 47/125 |
| 9,584,421 | B2* | 2/2017 | Rai | H04L 45/58 |
| 2001/0023453 | A1* | 9/2001 | Sundqvist | H04L 12/5695 709/232 |
| 2003/0069993 | A1* | 4/2003 | Na | H04L 29/12018 709/245 |
| 2005/0239444 | A1* | 10/2005 | Shieh | H04L 29/06027 455/414.1 |
| 2006/0209818 | A1* | 9/2006 | Purser | H04L 29/12009 370/389 |
| 2008/0137660 | A1* | 6/2008 | Olakangil | H04L 12/1836 370/392 |
| 2010/0002606 | A1* | 1/2010 | Preis | H04Q 3/0025 370/259 |
| 2010/0036903 | A1* | 2/2010 | Ahmad | H04L 67/1002 709/202 |
| 2010/0046515 | A1* | 2/2010 | Wong | H04L 12/5601 370/390 |
| 2010/0268764 | A1* | 10/2010 | Wee | G06F 9/505 709/203 |
| 2010/0287262 | A1* | 11/2010 | Elzur | H04L 41/5054 709/220 |
| 2011/0185082 | A1* | 7/2011 | Thompson | H04W 4/003 709/238 |
| 2011/0211579 | A1* | 9/2011 | Cao | H04L 45/02 370/392 |
| 2011/0261812 | A1* | 10/2011 | Kini | H04L 12/4633 370/389 |
| 2011/0283013 | A1* | 11/2011 | Grosser | H04L 61/103 709/232 |
| 2012/0033672 | A1* | 2/2012 | Page | H04L 45/245 370/395.53 |
| 2012/0066371 | A1* | 3/2012 | Patel | H04L 67/1031 709/224 |
| 2012/0106347 | A1* | 5/2012 | Allan | H04L 12/4625 370/238 |
| 2012/0155266 | A1* | 6/2012 | Patel | H04L 47/125 370/235 |
| 2013/0044757 | A1* | 2/2013 | Rai | H04L 47/125 370/395.53 |
| 2013/0227165 | A1* | 8/2013 | Liu | H04L 67/1027 709/238 |
| 2013/0286846 | A1* | 10/2013 | Atlas | H04L 45/34 370/236 |
| 2013/0308455 | A1* | 11/2013 | Kapadia | H04L 47/125 370/235 |
| 2013/0329730 | A1* | 12/2013 | Zhang | H04L 12/4641 370/392 |
| 2013/0339544 | A1* | 12/2013 | Mithyantha | H04L 45/02 709/238 |
| 2013/0343386 | A1* | 12/2013 | Sankar | H04L 47/41 370/392 |
| 2014/0029618 | A1* | 1/2014 | Janardhanan | H04L 45/586 370/392 |
| 2014/0089500 | A1* | 3/2014 | Sankar | H04L 47/125 709/224 |
| 2014/0126376 | A1* | 5/2014 | Rai | H04L 47/125 370/235 |
| 2014/0185446 | A1* | 7/2014 | Patel | H04L 47/125 370/235 |
| 2014/0310391 | A1* | 10/2014 | Sorenson, III | H04L 45/24 709/223 |
| 2014/0355563 | A1* | 12/2014 | Sane | H04W 36/0055 370/331 |
| 2014/0369204 | A1* | 12/2014 | Anand | H04L 47/125 370/235.1 |
| 2014/0379938 | A1* | 12/2014 | Bosch | H04L 47/125 709/242 |
| 2015/0023352 | A1* | 1/2015 | Yang | H04L 12/462 370/392 |
| 2015/0078152 | A1* | 3/2015 | Garg | H04L 41/0668 370/219 |
| 2015/0163144 | A1* | 6/2015 | Koponen | H04L 47/125 370/237 |
| 2015/0381484 | A1* | 12/2015 | Hira | H04L 45/64 370/390 |
| 2016/0065479 | A1* | 3/2016 | Harper | H04L 47/125 370/235.1 |
| 2016/0191457 | A1* | 6/2016 | Torzillo | H04L 61/2007 709/226 |
| 2016/0301608 | A1* | 10/2016 | Natarajan | H04L 45/7453 |

OTHER PUBLICATIONS

Curtis et al., DevoFlow: scaling flow management for high-performance networks, ACM SIGCOMM Computer Communication Review—SIGCOMM '11, SIGCOMM, vol. 41 Issue 4, Aug. 2011, p. 254-265.*

McKeown et al., OpenFlow: Enabling Innovation in Campus Networks, Apr. 2008, ACM SIGCOMM Computer Communication Review, vol. 38, No. 2, pp. 69-74.*

* cited by examiner

| Flow Identifier | State |
|---|---|
| 1002209 | D3 |
| 2080986 | D2 |
| 4582368 | D2 |
| 6854865 | D4 |

FIG. 10

TRANSPARENT NETWORK-SERVICES ELASTIC SCALE-OUT

CROSS REFERENCE TO OTHER APPLICATIONS

This application claims priority to U.S. Provisional Patent Application No. 61/866,481 entitled TRANSPARENT NETWORK-SERVICES ELASTIC SCALE-OUT BASED ON APPLICATION PERFORMANCE REQUIREMENTS CHANGE filed Aug. 15, 2013 which is incorporated herein by reference for all purposes.

BACKGROUND OF THE INVENTION

Data centers typically operate a great number of interconnected servers to implement certain network services. For example, security services such as firewalls are often used to inspect traffic for malware, intrusions, or other forms of security threats, permitting connections for authorized applications and blocking others. As another example, load balancing services are often implemented to balance workload across different servers. Other commonly employed services include content acceleration and transportation, application-specific security, analytics, authorization for the application, etc. Currently, these network services are typically implemented on separate physical boxes each capable of handling a certain amount of traffic. On each box there is a management and control plane handling management related functions such as configuration of policies, as well as a data plane that handles executing and processing packets based on configurations. It is often necessary to adjust the services to increase or decrease capacity. In many existing systems, because individual boxes handle traffic independently, capacity scaling can interrupt existing traffic flows as well as lead to inefficient distribution of traffic flows. It would be useful to maintain existing connections, efficiently distribute traffic flows, and keep the scaling process transparently to the client devices.

BRIEF DESCRIPTION OF THE DRAWINGS

Various embodiments of the invention are disclosed in the following detailed description and the accompanying drawings.

FIG. 10 is an example of a dispatch table.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Scaling network service capacity is disclosed. One or more existing devices are initially configured to provide a network service to a network application, and additional devices are further configured to provide the network service to the network application during a scale-out process. In some embodiments, an upstream network device supports Equal-Cost Multi-Path (ECMP) routing. The upstream network device is configured to include a plurality of paths directed from the upstream network device to reach an address associated with the network application. In some embodiments, the upstream network device does not support ECMP routing.

Figure 1:
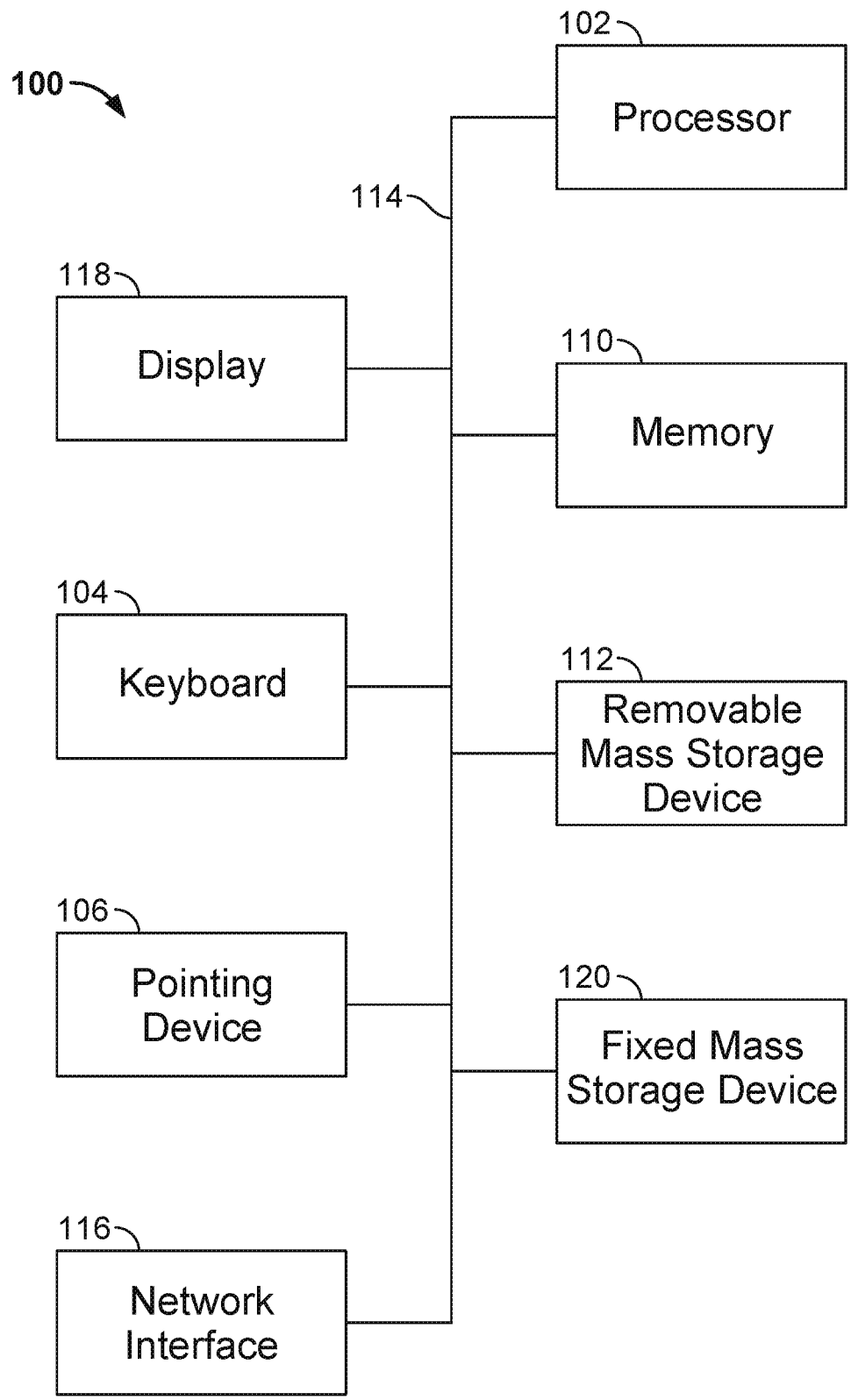
FIG. 1 is a block diagram illustrating an embodiment of a programmed computer system configured to perform one or more networking services and allow capacity scaling of the one or more networking services in accordance with some embodiments.

FIG. 1 is a block diagram illustrating an embodiment of a programmed computer system configured to perform one or more networking services and allow capacity scaling of the one or more networking services in accordance with some embodiments. As will be apparent, other computer system architectures and configurations can be used to perform network services and allow capacity scaling of the networking services. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to perform the processes described below with respect to FIGS. 5-7B.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, a pointing device 106, as well as an auxiliary input/output device interface, a sound card, speakers, and other subsystems as needed. One or more subsystems of each type can be included, and some subsystems can be omitted.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2A:
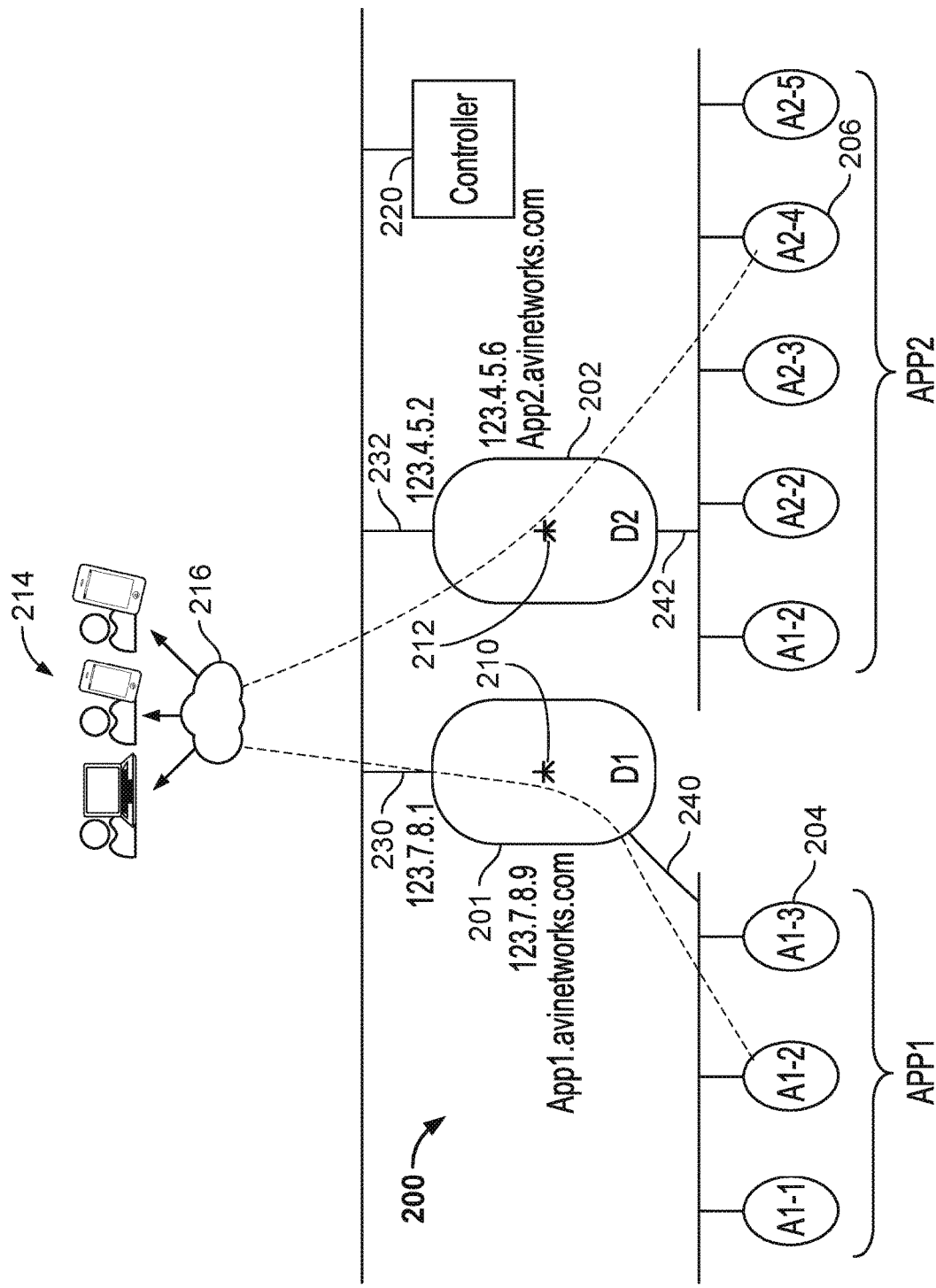
FIG. 2A is a block diagram illustrating an example of a distributed service platform in its initial state.

FIG. 2A is a block diagram illustrating an example of a distributed service platform in its initial state.

In this example, client devices 214 interact with network applications "App1" and "App2." Instances of the applications (e.g., processes executing the applications) 204 and 206 execute on devices on network 200. A client device can be a laptop computer, a desktop computer, a tablet, a mobile device, a smart phone, or any other appropriate computing device. In various embodiments, a web browser, a special purpose application, or other appropriate client application is installed at the client device, enabling a user to access network applications 204 and 206 via a network (e.g., the Internet). A network application (also referred to as a target application) is an application that is provided over a network. Examples of network applications include web applications, shopping cart applications, user authentication, credit card authentication, email, file sharing, virtual desktops, voice/video streaming, online collaboration, etc. The network applications may execute on application servers.

Network 200 can be a data center network, an enterprise network, or any other appropriate network. On network 200, device 201 ("D1") is configured to provide a first network service 210 to a first set of network application instances 204

("App1"), and device 202 ("D2") is configured to provide a second network service 212 to a second set of network application instances 206 ("App2"). As used herein, a device refers to an entity with one or more network interfaces through which networking traffic (e.g., packets) is sent and received. A device can be implemented using hardware, software, or a combination thereof. A device can be a physical device (e.g., a physical server computer such as 100), a virtual device (e.g., a virtual machine such as VMWare™ that executes on a system such as 100), or a combination thereof. A network interface can be implemented as a physical port (e.g., an Ethernet port, a wireless interface, etc.), a virtual port (e.g., software emulation of a physical port), or a combination thereof. A network service processes traffic between one or more clients and one or more network applications, providing services on behalf of the applications. Examples of network services include load balancing, authorization, security, content acceleration, analytics, application management, etc. Each network service can be implemented as a set of software code (e.g., a software process or a part of a process) that executes on hardware. In this example, one network service 210 is a firewall service that filters traffic sent to applications 206, and another network service 212 is a load balancing service that balances processing loads among applications 204.

In this example, each device has a network interface that connects the device to network 200. An Internet Protocol (IP) address is assigned to this network interface. As shown, the IP address of 123.7.8.1 is assigned to interface 230 of D1, and the IP address of 123.4.5.2 is assigned to interface 232 of D2. Each device provides service to its corresponding network applications under a unique Fully Qualified Domain Name (FQDN), which is translated into a unique IP address (also referred to as a virtual IP address). In this example, network applications 204 and network applications 206 are configured to be accessible to clients 214 at corresponding domain names. Each domain name corresponds to a unique IP address that is resolved by a DNS server. The DNS server stores the mappings of FQDNs to IP addresses, and can be used to look up the IP address of the network service that corresponds to a particular FQDN. In this example, application instances 204 are serviced by network service 210, and are accessible via interface 230 which maps to the URL of "App1.avinetworks.com" and the virtual IP address of 123.7.8.9. Application instances 206 are serviced by network service 212, and are accessible via interface 232 which maps to the URL of "App2.avinetworks.com" and the virtual IP address of 123.4.5.6.

Instances of network applications 204 and 206 can operate on devices 201, 202, and/or one or more other devices. The configuration is flexible and can be different in various embodiments. In this example, traffic (e.g., packets associated with traffic flows) from client devices 214 is sent to device 201 or 202 and processed by network service 210 or 212, respectively. For example, traffic designated for applications 204 (e.g., requests pertaining to the URL of "App1.avinetworks.com" sent by the clients) is filtered by firewall service 210 and sent to an application instance 204 to be further processed as appropriate. Traffic designated for applications 206 (e.g., requests pertaining to the URL of "App2.avinetworks.com" sent by the clients) is load balanced by load balancing service 212 and sent to an application instance 206 to be further processed. Different network services can be used.

An upstream network device 216 is configured to forward traffic from client devices 214 destined for the network applications to devices such as D1 or D2. Examples of an upstream network device include a router, a switch, a bridge, etc. While the same upstream network devices can also be configured to forward packets from network 200 to client devices 214, for purposes of discussion, network 200 is referred to as the end of the network traffic stream from the client, and points on the network path before the packet reaches network 200 are said to be upstream from the network.

In this example, the upstream network device maintains configuration information that includes routing information (e.g., a routing table) specifying the routes for certain network destinations. The configuration information further includes the mapping of IP addresses to hardware identification information (e.g., an ARP table).

Later, due to increased load for applications 206, it is determined that D2 (the original device) does not have sufficient resources to provide network service 212 to applications 206, and more devices need to be added to add additional capacity. The process of increasing capacity is referred to as a scale-out process. The determination that a scale-out should take place can be made by D2 itself or by a controller 220 (which can be a separate device implemented using a system such as 100, or a part of D2). For example, a monitoring application on D2 or the controller may determine that the number of flows handled by network service 212 has been exceeded. According to preconfigured policies, D2 or the controller will initiate the scale-out process. The scale-out process is described in greater detail below.

Figure 2B:
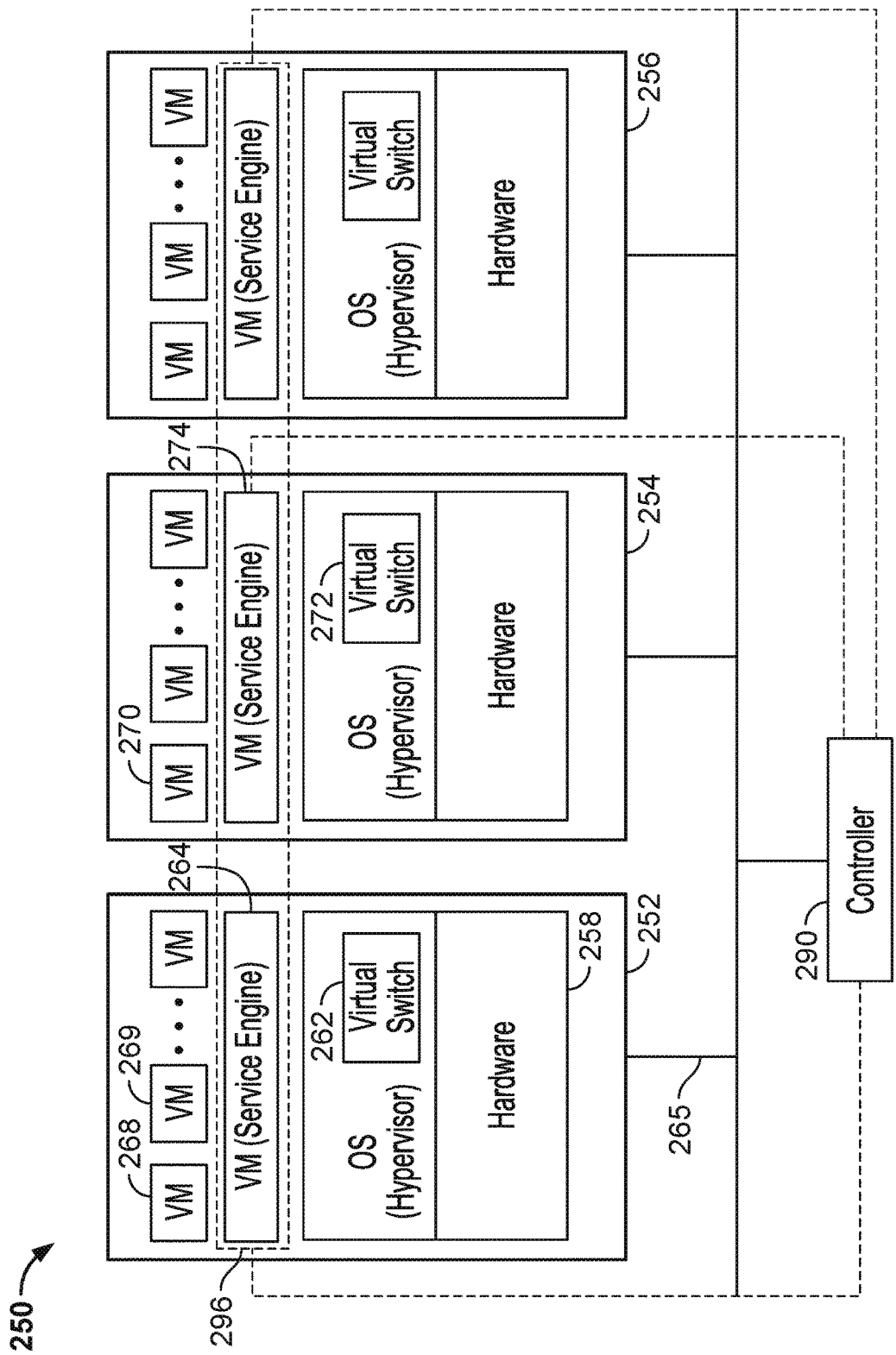
FIG. 2B is a block diagram illustrating an embodiment of a distributed network service platform.

In some embodiments, the devices are physical devices. In some embodiments, the devices are implemented using a distributed network service platform comprising virtual machines that cooperate to function as a single device. FIG. 2B is a block diagram illustrating an embodiment of a distributed network service platform. In this example, platform 250 can be used to implement network 200 of FIG. 2A. Platform 250 includes a number of servers configured to provide a distributed network service. A physical server (e.g., 252, 254, 256, etc.) has hardware components and software components, and may be implemented using a device such as 100. In particular, hardware (e.g., 258) of the server supports operating system software in which a number of virtual machines (VMs) (e.g., 264, 268, 269, etc.) are configured to execute. A VM is a software implementation of a machine (e.g., a computer) that simulates the way a physical machine executes programs. In the example shown, service engines as well as other network applications execute in the VM. The part of the server's operation system that manages the VMs is referred to as the hypervisor. The hypervisor interfaces between the physical hardware and the VMs, providing a layer of abstraction to the VMs. Through its management of the VMs' sharing of the physical hardware resources, the hypervisor makes it appear as though each VM were running on its own dedicated hardware. Examples of hypervisors include the VMware Workstation® and Oracle VM VirtualBox®.

In some embodiments, instances of network applications are configured to execute within the VMs. Examples of such network applications (e.g., 204 or 206 of FIG. 2A) include web applications such as shopping cart, user authentication, credit card authentication, email, file sharing, virtual desktops, voice/video streaming, online collaboration, etc. As will be described in greater detail below, a distributed network service layer is formed to provide multiple application instances executing on different physical devices with network services. As used herein, network services refer to services that pertain to network functions, such as load balancing, authorization, security, content acceleration, analytics, application management, etc. As used herein, an application that is serviced by the distributed network service is referred to as a target application. Multiple instances of an application (e.g., multiple processes) can be launched on multiple VMs.

Inside the hypervisor there are multiple modules providing different functionalities. One of the modules is a virtual switch (e.g., 262, 272, etc.). A physical hardware has one or more physical ports (e.g., Ethernet ports). Network traffic (e.g., data packets) can be transmitted or received by any of the physical ports, to or from any VMs. The virtual switch is configured to direct traffic to and from one or more appropriate VMs, such as the VM in which the service engine on the device is operating.

One or more service engines (e.g., 264, 274, etc.) are instantiated on a physical device. In some embodiments, a service engine is implemented as software executing in a virtual machine. The VM implementing the service engine runs alongside other VMs, such as those implementing the network applications. The service engine is executed to provide distributed network services for applications executing on the same physical server as the service engine, and/or for applications executing on different physical servers. In some embodiments, the service engine is configured to enable appropriate service components that implement service logic. For example, a load balancer network service is executed to provide load balancing logic to distribute traffic load amongst instances of network applications executing on the local physical device as well as other physical devices; a firewall network service is executed to provide firewall logic to instances of the network applications on various devices. Many other service components may be implemented and enabled as appropriate. When a specific service (e.g., a load balancing network service, a firewall network service, etc.) is desired, the service is invoked on the service engine.

In some embodiments, the performance of the network applications is monitored by the service engines, which are in turn monitored by controller 290. In some embodiments, all service engines maintain their own copy of current performance status of the network applications. A dedicated monitoring service engine is selected to send heartbeat signals (e.g., packets or other data of predefined format) to the network applications and update the performance status to other service engines as needed. For example, if a heartbeat is not acknowledged by a particular network application instance within a predefined amount of time, the monitoring service engine will mark the network application instance as having failed, and disseminate the information to other service engines. In some embodiments, controller 290 collects performance information from the service engines, analyzes the performance information, and sends data to client applications for display.

A virtual switch such as 262 interacts with the service engines, and uses existing networking Application Programming Interfaces (APIs) (such as APIs provided by the operating system) to direct traffic and provide distributed network services for network applications deployed on the network. The operating system and the network applications implement the API calls (e.g., API calls to send data to or receive data from a specific socket at an Internet Protocol (IP) address). As will be described in greater detail below, in some embodiments, the virtual switch is configured to be in-line with one or more VMs and intercepts traffic designated to and from instances of the network applications executing on the VMs. When a networking API call is invoked, traffic is intercepted by the in-line virtual switch, which directs the traffic to or from the appropriate VM on which instances of the network application execute. In some embodiments, a service engine sends data to and receives data from a network application via the virtual switch.

A controller 290 is configured to control, monitor, program, and/or provision the distributed network services and virtual machines. In particular, the controller is configured to control, monitor, program, and/or provision a group of service engines, and is configured to perform functions such as bringing up the service engines, downloading software onto the service engines, sending configuration information to the service engines, monitoring the service engines' operations, detecting and handling failures, and/or collecting analytics information. The controller can be implemented as software, hardware, firmware, or any combination thereof. In some embodiments, the controller is deployed within the VM of a physical device or other appropriate environment. In some embodiments, the controller interacts with client applications to provide information needed by the user interface to present data to the end user, and with a virtualization infrastructure management application to configure VMs and obtain VM-related data. In some embodiments, the controller is implemented as a single entity logically, but multiple instances of the controller are installed and executed on multiple physical devices to provide high availability and increased capacity. In some embodiments, known techniques such as those used in distributed databases are applied to synchronize and maintain coherency of data among the controller instances.

In the example shown, the service engines cooperate to function as a single entity, forming a distributed network service layer 296 to provide services to the network applications. In other words, although multiple service engines (e.g., 264, 274, etc.) are installed and running on multiple physical servers, they cooperate to act as a single layer 296 across these physical devices. In some embodiments, the service engines cooperate by sharing states or other data structures. In other words, copies of the states or other global data are maintained and synchronized for the service engines and the controller.

In some embodiments, a single service layer is presented to the network applications to provide the network applications with services. For example, service layer 296 can be used to implement a service such as 212 of FIG. 2A to provide applications 206 with services. The interaction between the network applications and service layer is transparent in some cases. For example, if a load balancing service is provided by the service layer, the network application sends and receives data via existing APIs as it would with a standard, non-distributed load balancing device. In some embodiments, the network applications are modified to take advantage of the services provided by the service layer. For example, if a compression service is provided by the service layer, the network application can be reconfigured to omit compression operations.

From a network application's point of view, a single service layer object is instantiated. The network application communicates with the single service layer object, even though in some implementations multiple service engine objects are replicated and executed on multiple servers.

Traffic received on a physical port of a server (e.g., a communications interface such as Ethernet port 265) is sent to the virtual switch (e.g., 262). In some embodiments, the virtual switch is configured to use an API provided by the hypervisor to intercept incoming traffic designated for the network application(s) in an in-line mode, and send the traffic to an appropriate service engine. In in-line mode, packets are forwarded on without being replicated. As shown, the virtual switch passes the traffic to a service engine in the distributed network service layer (e.g., the service engine on the same physical device), which transforms the packets if needed and redirects the packets to the appropriate network application. The service engine, based on factors such as configured rules and operating conditions, redirects the traffic to an appropriate network application executing in a VM on a server. Some examples of how to select an appropriate instance of the network application are described below in connection with specific example applications such as load balancing.

Figure 3:
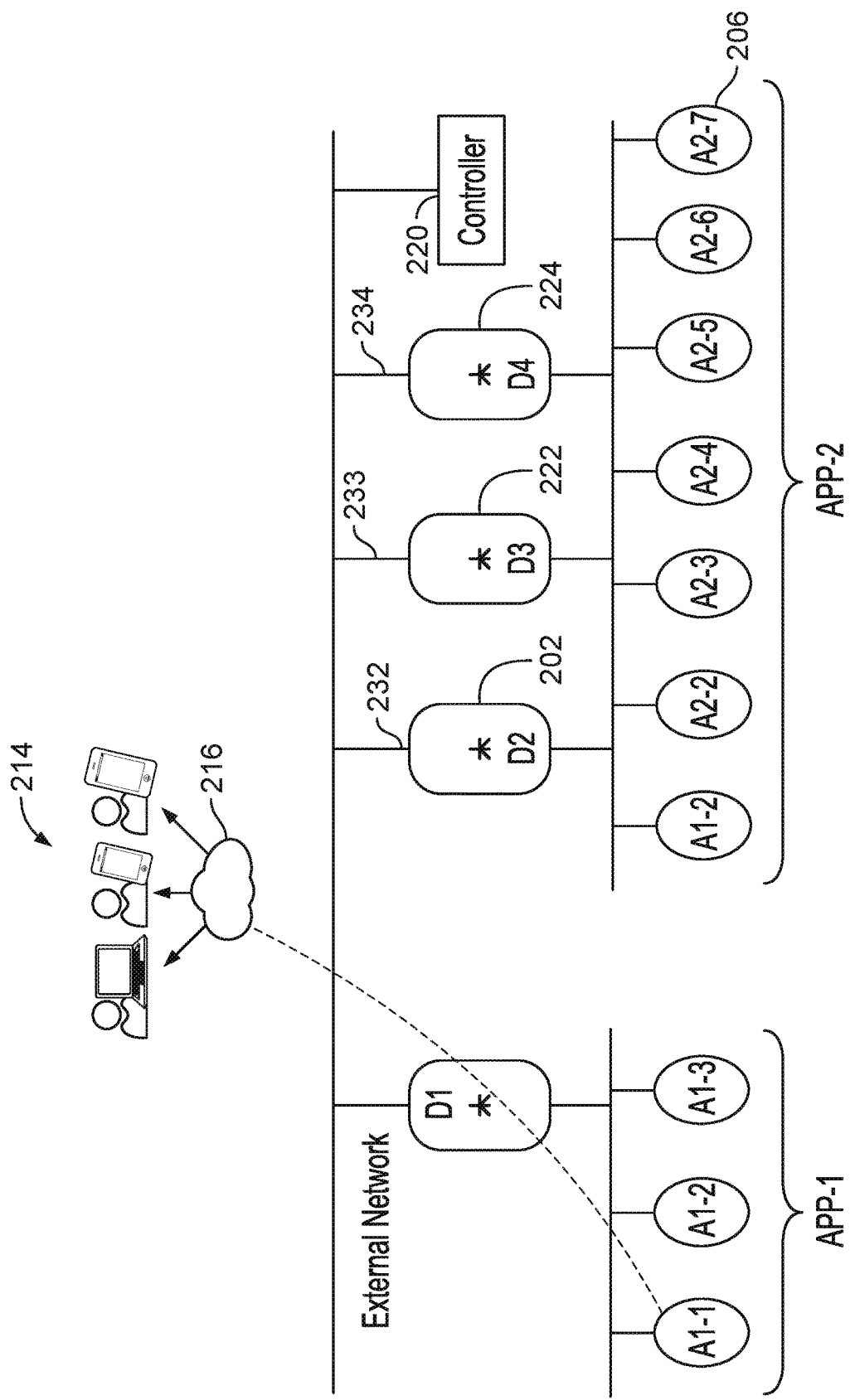
FIG. 3 is a block diagram illustrating an example of the distributed service platform in its scaled-out state.

FIG. 3 is a block diagram illustrating an example of the distributed service platform in its scaled-out state. In this example, the scale-out process has been successfully completed. Additional devices 222 (D3) and 224 (D4) have been added to also provide network service 212 to application instances 206. Specifically, instances of processes for network service 212 are launched or activated on D3 and D4. Although a single original device and two additional devices are shown in this example, any number of original or additional devices can be used depending on system implementation and/or operating conditions.

As will be described in greater detail below, in some embodiments, upstream network device 216 supports equal cost multipath (ECMP) routing, and new flows from clients 214 are load balanced and directly distributed to devices D2-D4 to be serviced by the respective network service instances operating on these devices. In some embodiments, upstream network device 216 does not support ECMP routing, and a new flow from client 214 is sent to D2 first, that load balances and redistributes the flow to D3 or D4. As used herein, a flow refers to network traffic associated with a connection between two points on a network, such as data packets that are exchanged between two different applications operating on different devices. A flow can be bidirectional or unidirectional, and is usually identified using packet header information such as source IP address, destination IP address, source port, destination port, and protocol (referred to as the 5-tuple information).

Figure 5:
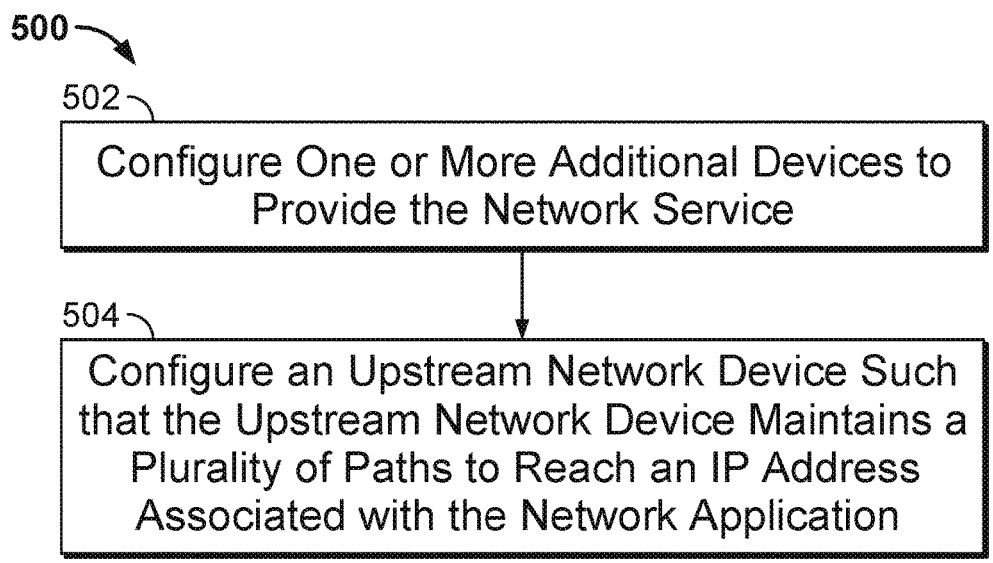
FIG. 5 is a flowchart illustrating an embodiment of a scale-out process with ECMP support at the upstream network device.
Figure 9:
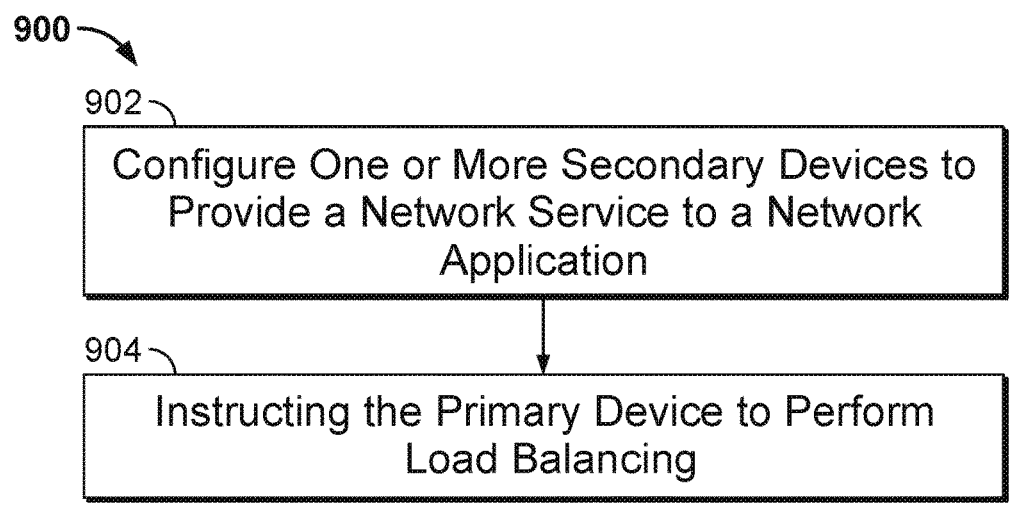
FIG. 9 is a flowchart illustrating an embodiment of a scale-out process without ECMP support at the upstream network device.

In some embodiments, an application programming interface (API) call is made by controller 220 to query the upstream network device to determine whether it supports ECMP. If the response from the upstream network device indicates that there is ECMP support, then process 500 of FIG. 5 is invoked. If the response indicates that there is no ECMP support, or if no response is successfully received, then process 900 of FIG. 9 is invoked. In some embodiments, an administrator has knowledge about whether the upstream network device supports ECMP, and may manually invoke process 500 or 900 depending on whether there is ECMP support.

As shown in FIG. 2A, prior to the scale-out process, there is at least one existing device already configured to provide a network service to a set of applications. In embodiments where the upstream network device provides ECMP support, the routing table of the upstream network device includes an entry indicating the path for reaching the virtual IP address of the application via the existing device. Specifically, the next hop of the path corresponds to the IP address of the existing device's interface. In this example, the routing table entry indicates that a path for the upstream network device to reach the virtual IP address of 123.4.5.6 has as its next hop interface 232 of D2 (which has an IP address of 123.4.5.2).

Figure 4:
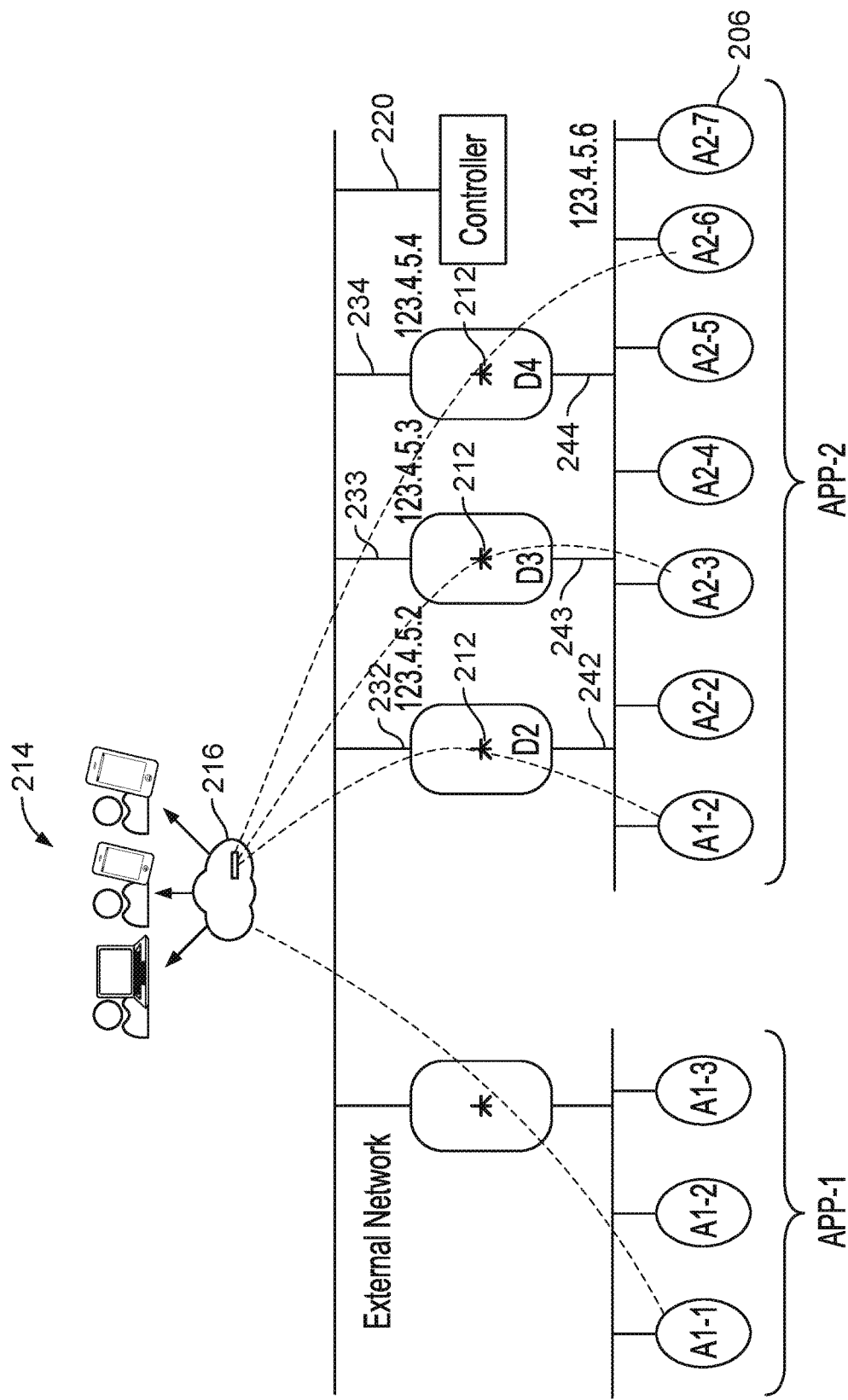
FIG. 4 is a block diagram illustrating an embodiment of the distributed service platform in its scaled-out state, where the upstream network device supports ECMP.

FIG. 4 is a block diagram illustrating an embodiment of the distributed service platform in its scaled-out state, where the upstream network device supports ECMP. When new devices D3 and D4 are added, two additional paths via these devices are added to upstream network device 216's routing table as next hops for reaching the virtual IP address 123.4.5.6 (for example, /32 routes that are equal-cost are added in some embodiments). As will be described in greater detail below, based on ECMP routing protocol, upstream network device 216 automatically provides load balancing for new flows to be serviced by D2, D3, or D4. Existing flows handled by D2 prior to the scale-out process are still serviced by D2.

FIG. 5 is a flowchart illustrating an embodiment of a scale-out process with ECMP support at the upstream network device. Process 500 can be performed by controller 220. In various embodiments, controller 220 can be implemented as a separate device on network 200, or as a component of one of the devices.

Due to the need to increase capacity, at 502, one or more additional devices (e.g., devices D3 and D4) are configured to also provide the same network service. In some embodiments, configuration information is sent to one or more devices to configure the devices to provide network service to the network application. In some embodiments, the configuration information includes a request to launch or activate one or more network service instances. The request is made using a proprietary protocol.

Referring to the initial state shown in FIG. 2A, a packet sent by a client 214 destined for App2 is first sent to upstream network device 216. Device D2 provides a path for the packet from the upstream network device to the virtual IP address of App2; specifically, the path specifies that the next hop for the packet from the upstream network device to reach the virtual IP address associated with App2 (123.4.5.6) is via D2's network interface 232, which has the IP address of 123.4.5.2. This path is maintained in the upstream network device's routing table. Once the packet is routed to D2, D2 performs network service 212 on the packet. When scale-out is performed, as shown in FIG. 4, one or more additional devices (e.g., D3 and D4) are configured to also provide network service 212. Specifically, instances of network service 212 are launched on devices such as D3 and D4.

Returning to FIG. 5, at 504, configuration information is sent to an upstream network device to configure the upstream network device, such that the upstream network device maintains a plurality of paths to reach the virtual IP address associated with the network application. In this example, the upstream network device supports ECMP, and supports programmatic configuration changes. For example, APIs for setting configuration parameters, making changes to its routing table, etc. are specified in some embodiments. Accordingly, configuration requests can be made by the controller making appropriate API calls. The configuration information can be sent using messages, API calls, or the like supported by the upstream network device. In this case, the newly added devices and the existing device provide equal-cost paths from the upstream network device to reach network application instances. The configuration request from the controller requests the upstream network device to add paths to its routing table: one for the upstream network device to reach the virtual IP address of 123.4.5.6 via a next hop to interface 233 of D3 (which has an IP address of 123.4.5.3), another for reaching the same virtual IP address via a next hop to interface 234 of D4 (which has an IP address of 123.4.5.4). These paths are equal in cost as the existing path from the upstream network device to 123.4.5.6 via a next hop to interface 232 of D1 (which has the IP address of 123.4.5.2).

When a client sends a packet designated for the URL associated with application 206 (e.g., "App2.avinetworks.com"), the DNS server resolves this URL to its corresponding virtual IP address (e.g., "123.4.5.6"). The packet is sent to the upstream network device, which, based on its routing table, determines that there is a set of equal-cost paths to reach this virtual IP address (e.g., via the next hop to IP addresses 123.4.5.2, 123.4.5.3, or 123.4.5.4). For a packet that corresponds to a new flow, the upstream network device performs ECMP routing with load balancing, and sends the flow to a selected one of the networking devices. In this example, to perform load balancing, the upstream router computes the hash of the 5-tuple, and picks one of the paths based on the hash. For a packet that corresponds to an existing flow, the upstream network device sends the packet to the networking device that has been selected to service the flow, unless the selected device is no longer available (e.g., has scaled down, has crashed, etc.) The process for handling a packet at the device is described in greater detail below in connection with FIGS. 6A and 6B.

Figure 7A:
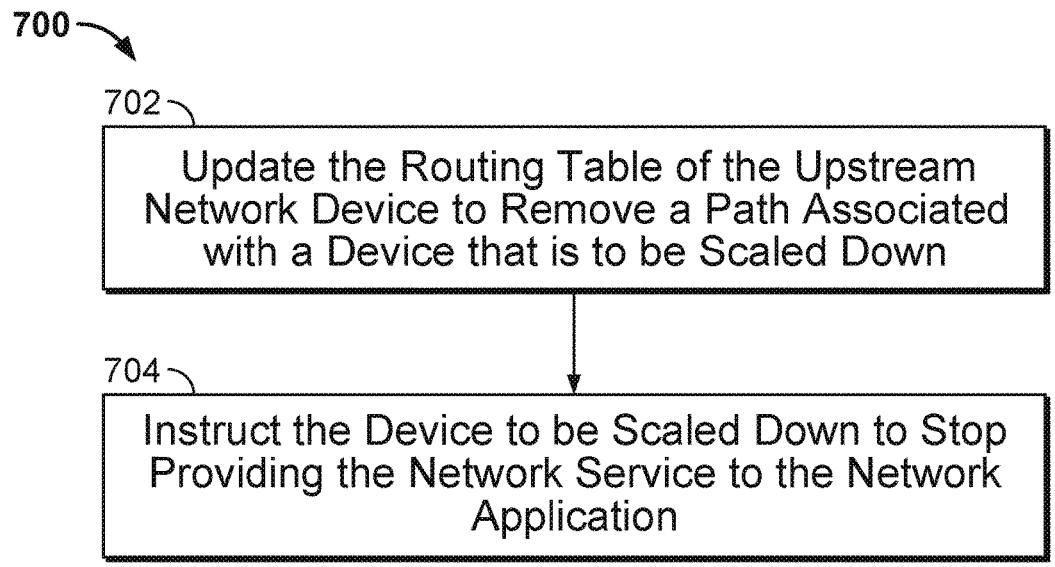
FIG. 7A is a flowchart illustrating an embodiment of a process to perform a scale-down capacity adjustment.

Later, if it is determined (e.g., by the controller and/or health monitor) that there is excess capacity for the network service, a scale-down capacity adjustment is performed. FIG. 7A is a flowchart illustrating an embodiment of a process to perform a scale-down capacity adjustment. Process 700 can be performed by a controller.

At 702, the routing table of the upstream network device is updated to remove a path associated with a device that is to be scaled down. This way, new flows will not be sent to this device. In some embodiments, the upstream network device supports an API for making updates to its routing table. Accordingly, the update can be made by making an API call with information about which device is to be scaled-down.

At 704, the device to be scaled down is instructed to stop providing the network service. In some embodiments, the scaled-down device will finish servicing its existing flows. When the existing flows are completed (e.g., when the connections close or timeout), the scaled-down device will shut down or deactivate the operation of its network service to conserve computation resources and make itself available to other services.

In some embodiments, the upstream network device does not support ECMP. Thus, the upstream network device is not configured to perform load balancing functions among devices D2, D3, and D4. Instead, a primary device is selected, and the load balancing function is performed by the primary device. Preferably, an existing device is selected as the primary. If a primary device fails, another primary device is selected among the remaining devices. The selection can be random or based on load on the device.

Figure 8:
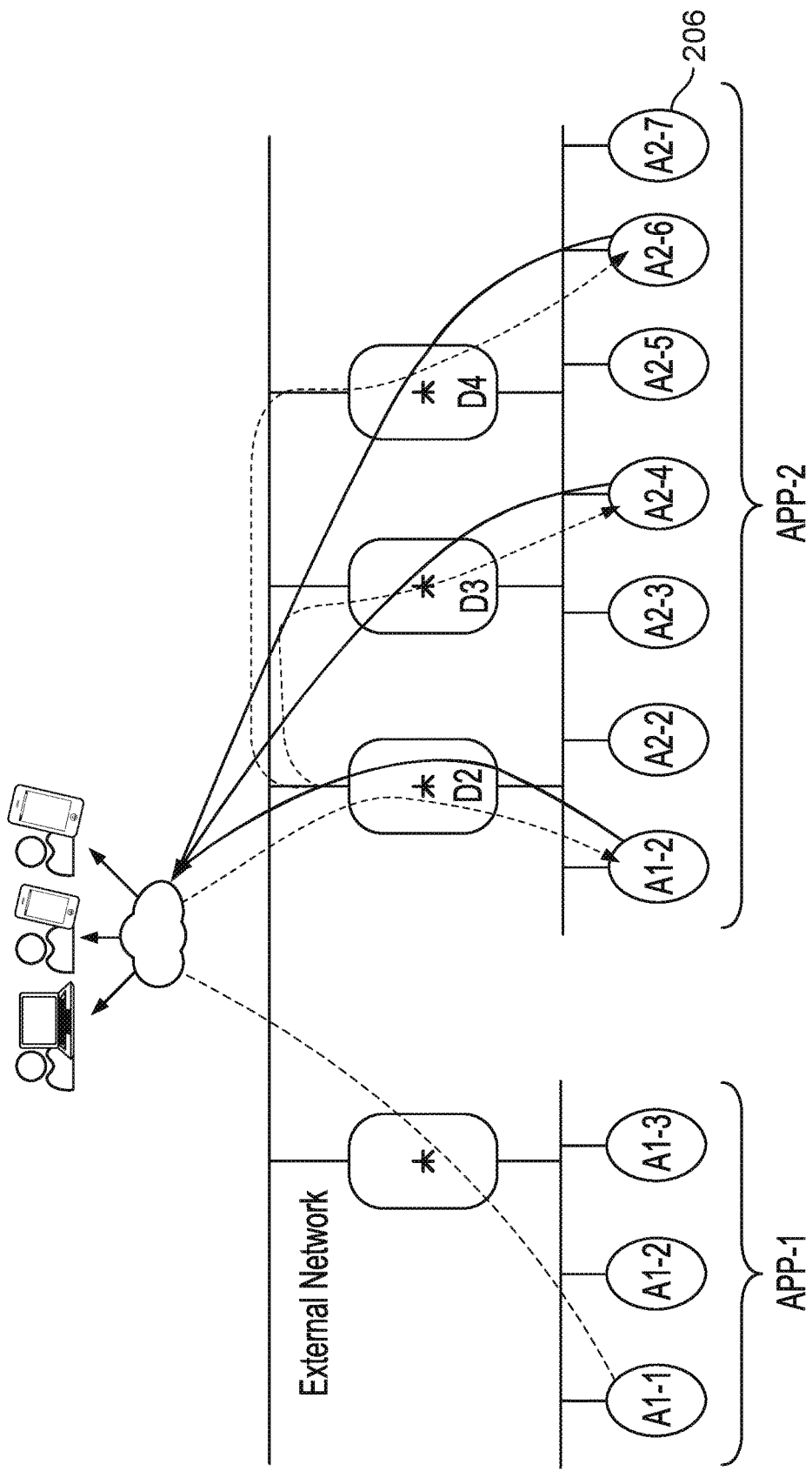
FIG. 8 is a block diagram illustrating an embodiment of the distributed service platform in its scaled-out state, where the upstream network device does not support ECMP.

FIG. 8 is a block diagram illustrating an embodiment of the distributed service platform in its scaled-out state, where the upstream network device does not support ECMP. In this configuration, prior to scaling-out, the upstream network device does not necessarily have a path in its routing table that reaches the virtual IP address (123.4.5.6) of application 206 via the network interface of D2. When a packet designated for the virtual IP address of 123.4.5.6 is received, the upstream network device sends an ARP request to determine where to forward this packet. D2 will respond with its MAC address, and the upstream network device will store the mapping of the virtual IP address and D2's MAC address in its ARP table.

When new devices D3 and D4 are added, they are configured to not respond to the ARP request for the virtual IP address associated with network application 206. In other words, when an ARP request for virtual IP address 123.4.5.6 is made, D3 and D4 will not respond, and consequently there will be no ARP entry associated with the MAC address of D3 or D4 stored in the ARP table. This way, the upstream router will continue to send all incoming packets designated for the application's virtual IP address to D2 but not to D3 or D4. D2 continues to handle existing flows, and in addition performs load balancing on new flows. The load balancing can be performed based on a variety of criteria, such as number of connections being handled, CPU usage, etc. In some embodiments, D2 load balances traffic among D2, D3 and D4 using known load balancing techniques such as weighted round robin based on the number of connections, CPU utilization, bandwidth utilization, and/or other appropriate factors. Other load balancing techniques can be used.

FIG. 9 is a flowchart illustrating an embodiment of a scale-out process without ECMP support at the upstream network device. Process 900 can be performed by a controller.

Prior to process 900, at least one existing device is already providing the network service to the applications. One of the existing devices is specified as the primary device (e.g., D2 of FIG. 2A), which will receive flows from the upstream network device and perform load balancing on new flows.

When scale-out is initiated, at 902, one or more secondary devices are configured to provide a network service to a network application comprising a plurality of network application instances. Specifically, one or more instances of processes for the network service are launched or activated on the secondary devices. In some embodiments, the configuration information is sent to the secondary devices according to a proprietary protocol. The secondary devices parse the configuration information to obtain included information such as instructions to launch the network service, not to respond to the ARP request, etc.

Referring to FIG. 8, secondary devices D3 and D4 are configured to provide network service 212 to application instances 206. In addition, the secondary devices are configured not to respond to an Address Resolution Protocol (ARP) request associated with the IP address of the network application, so that no entries exist for the secondary devices in the ARP table of the upstream networking device. The exact function call used for making the ARP request depends on TCP/IP stack implementation. Accordingly, all incoming packets destined for application 206 are sent to D2, which will perform load balancing and forward packets on to D3 or D4 as appropriate.

At 904, the primary device is instructed to load balance traffic destined for the network application among the plurality of devices. In some embodiments, the primary device itself is included in the load balancing. For example, D2 can load balance traffic (e.g., new flows) among D2, D3, and D4 based on the number of connections handled by each device, the amount of traffic, CPU utilization, etc. Weighted round-robin or other appropriate load balancing techniques can be used.

In this example, each device is informed of the primary/secondary status (i.e., whether a device is primary or secondary) of all the devices, as well as the MAC addresses of other devices. The information is stored and used when a device needs to forward packets to other devices.

Figure 7B:
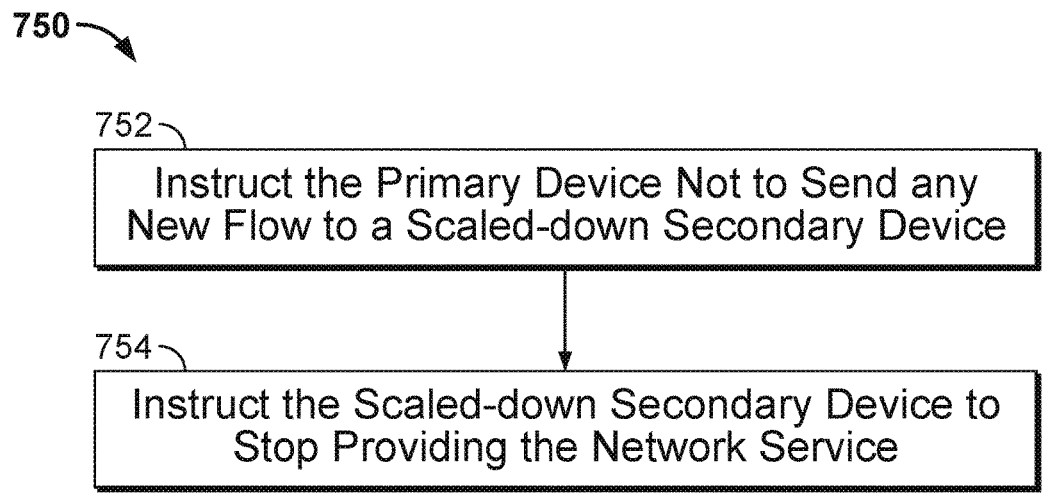
FIG. 7B is a flowchart illustrating an embodiment of a process to perform a scale-down capacity adjustment.

Later, if it is determined (e.g., by the controller and/or health monitor) that there is excess capacity for the network service, a scale-down capacity adjustment is performed. FIG. 7B is a flowchart illustrating an embodiment of a process to perform a scale-down capacity adjustment. Process 750 can be performed by a controller.

At 752, the primary device is instructed not to send any new flow to a scaled-down secondary device. The instruction can be sent via a proprietary protocol.

At 754, the secondary device to be scaled down is instructed to stop providing the network service. In some embodiments, the scaled-down device will finish servicing its existing flows. When the existing flows are completed (e.g., when the connections close or timeout), the scaled-down device will shut down or deactivate the operation of its network service to conserve computation resources and make itself available to other services.

In some embodiments, a dispatch layer is implemented in the networking devices to handle packets received from the upstream network device. The dispatch layer is implemented as software and/or firmware code in a device's operating system, specifically in the network interface device driver (e.g., a poll-mode driver), as a layer below the TCP/IP stack. Packets received on the device interface are examined by the device driver/dispatch layer before they are passed on to the TCP/IP stack as appropriate. A packet is processed by the dispatch layer, and depending on the result of the processing, the packet can be dropped, sent directly out via the device's network interface, or sent to the device's TCP/IP stack to be further processed.

In some embodiments, the dispatch layer includes a flow information store that maintains flow states. In some embodiments, the flow information store is implemented as a dispatch table (also referred to as a state table or a flow table), although other data structures and implementations can be used. FIG. 10 is an example of a dispatch table. In this example, each entry in the dispatch table corresponds to a flow, and includes a flow identifier and a state. The flow identifier identifies the flow. In some embodiments, the flow identifier is constructed based on header information such as source IP address, destination IP address, source port, destination port, and protocol (referred to as the 5-tuple information) of the packet. In some embodiments, a hash function is applied to the 5-tuple information to generate the flow identifier. The state specifies identification information of the device configured to handle the flow. Additional/other fields can be included in other embodiments.

As will be described in greater detail below, entries corresponding to new flows are added to the dispatch table. When a packet is received, the flow identifier is determined based on packet data (e.g., by obtaining the 5-tuple information and performing the hash function). To determine whether a packet corresponds to an existing flow, its (hashed) 5-tuple information is obtained and looked up in the dispatch table. If there is a corresponding entry in the table, then the packet belongs to an existing flow.

Figure 6A:
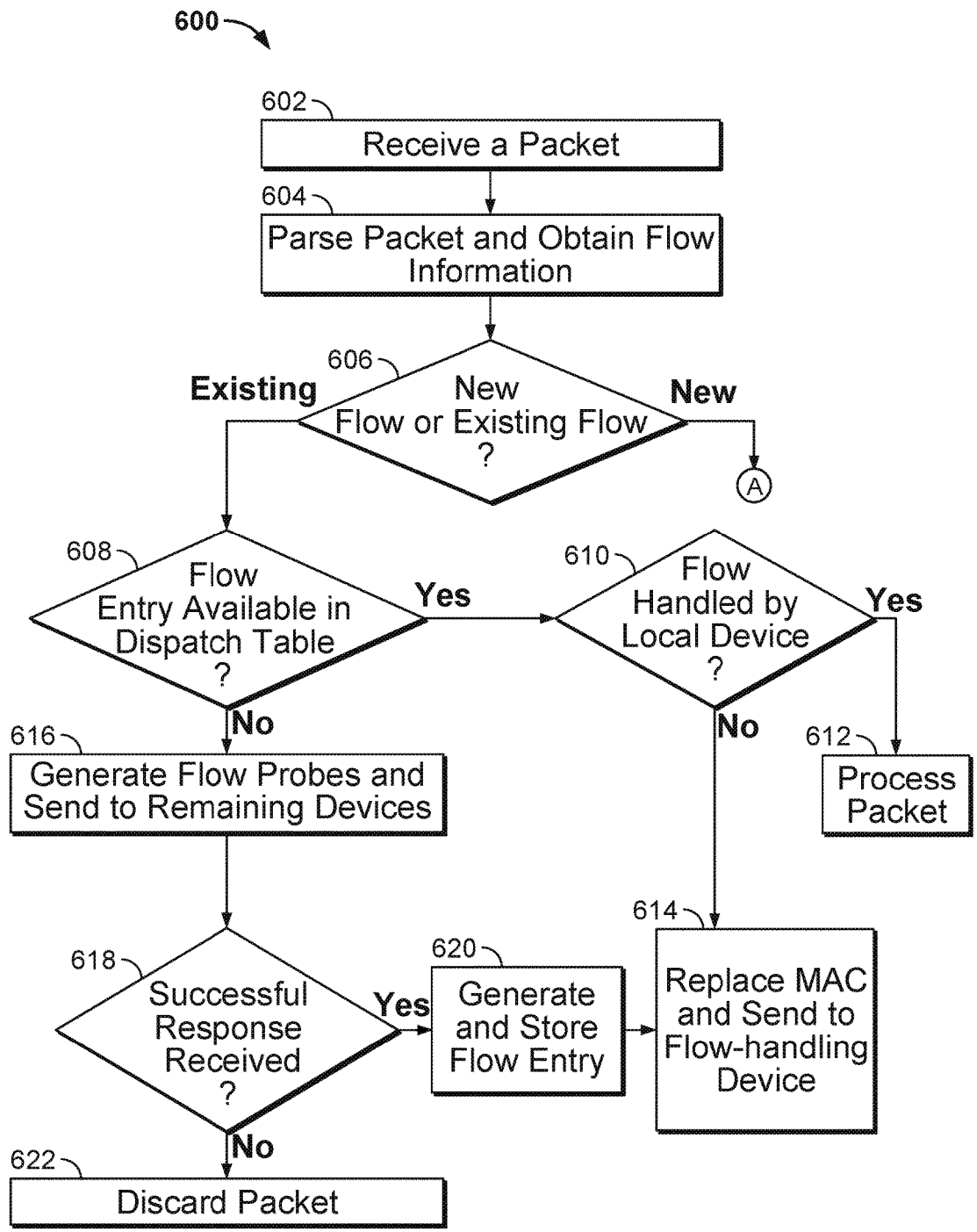
FIGS. 6A-6B is a flowchart illustrating an embodiment of a dispatch process for handling a packet.
Figure 6B:
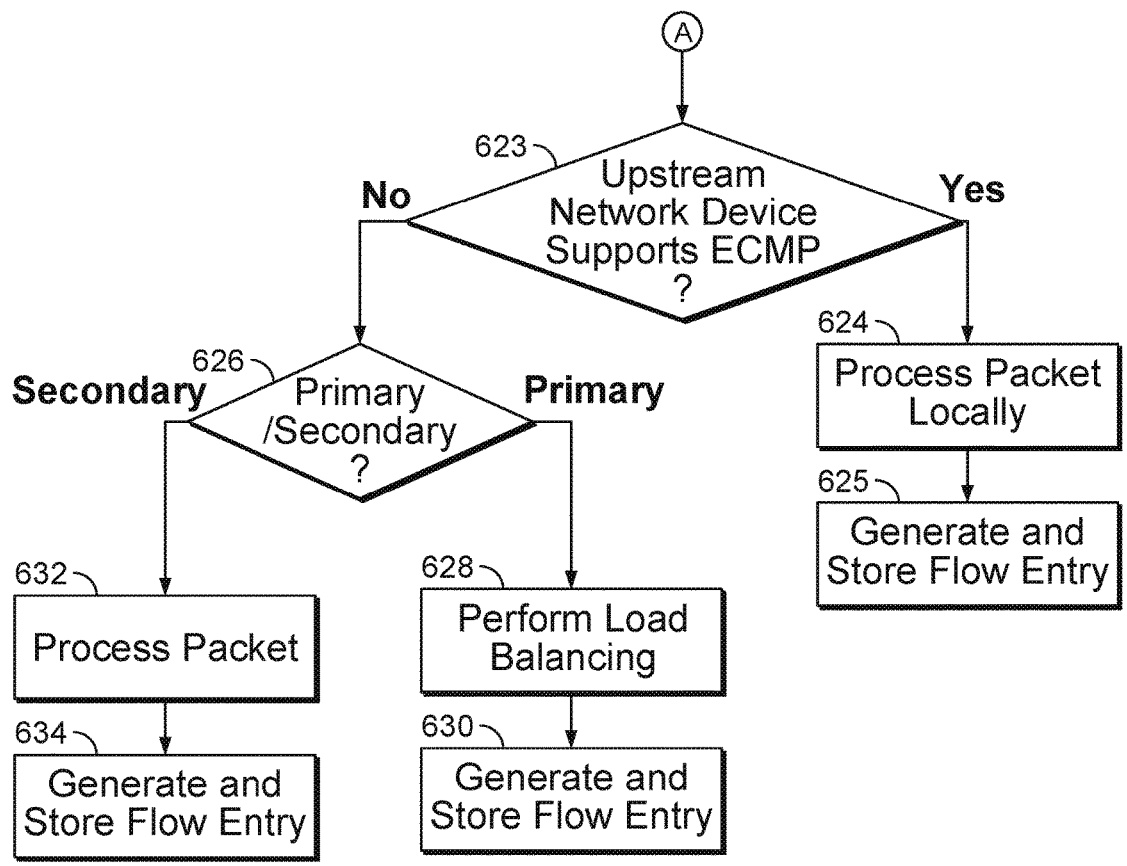

FIGS. 6A-6B is a flowchart illustrating an embodiment of a dispatch process for handling a packet. Process 600 is performed by a device. As will be shown below, the process can be implemented on D2, D3, or D4, and depending on its role and environment, different portions of the process may be executed. In some embodiments, the steps are performed in the dispatch layer.

At 602, a packet is received on a networking interface. As discussed above, the packet can be forwarded by the upstream network device or by another device such as the primary device, and is destined for the network application. The packet is received on a networking interface such as 232, 233, or 234.

At 604, the packet is parsed. Various header fields are extracted from the packet according to TCP header specifications. In some embodiments, flow identification information such as the 5-tuple information and the SYN flag are obtained. The hash function is applied to the 5-tuple information to obtain the flow identifier as needed.

At 606, it is determined whether the packet is associated with a new flow or an existing flow. In a TCP flow, the determination is made by checking the SYN flag of the packet. The SYN flag is set to 1 if the packet is associated with a new flow (i.e., it is the first packet in a flow), and is set to 0 if the packet is associated with an existing flow.

If the packet is associated with an existing flow, the flow identification information is used to lookup the flow entry in a local flow information storage (e.g., the dispatch table) to determine whether a corresponding flow entry is available in the dispatch table, at 608.

If an existing entry that matches the flow identification information is found in the dispatch table, the packet should be processed by whichever flow-handling device is specified in the flow entry. At 610, it is determined whether the device specified by the entry to process the flow is the local device (i.e., the device that is performing process 600). If yes, at 612, the packet is processed by the local device. Specifically, the packet is passed to the device's TCP/IP layer and further processed by the network service. If the flow-handling device specified by the entry is a different device than the local device, at 614, the MAC address of the packet is replaced with the MAC address of the flow-handling device, and the packet is sent to the flow-handling device using an appropriate TCP/IP call. Note that at this point the flow entry already exists in the table and does not need to be generated.

If the packet belongs to an existing flow, but no matching entry is found in the dispatch table, it indicates that there may have been changes in the routing table of the upstream network device. This situation may arise in embodiments of the network where the upstream network device supports ECMP. In some embodiments, the devices periodically send out heartbeat/health status to the controller and/or a health monitor. If no heartbeat is received, or if the health status indicates that a device has failed, the controller and/or health monitor will inform the upstream network device with information about the failed and/or remaining devices so that the upstream network device will remove the routing path associated with the failed device and load balance traffic among the remaining devices. Because a packet associated with a flow previously handled by the failed device will now be sent to a remaining device, there may not be a corresponding flow entry in the remaining device's dispatch table. The controller and/or health monitor will also inform the remaining devices with information about the failed and/or remaining devices, so that the remaining device can query each other about flow status (e.g., which device is handling a particular flow).

At 616, one or more flow probes are generated based on the header information of the packet, and sent to one or more remaining devices. A flow probe includes the 5-tuple information and has the MAC address of the local device currently executing process 600 as the source MAC address. The destination MAC address is a remaining device being queried. Multiple flow probes may be generated and sent to each remaining device. In some embodiments, the flow probe is sent as a layer-2 packet using an Ethernet protocol call.

At 618, it is determined whether a successful response to the flow probe is received from a remaining device. If no successful response is received, the packet is discarded at 622. Otherwise, the process proceeds to 620, where a flow entry is generated based on the 5-tuple information and identification information of the device that responded, and stored in the dispatch table. At 614, the destination MAC address of the packet is replaced with the MAC address of the flow-handling device, and the packet is sent to the flow-handling device.

If the packet belongs to a new flow, at 623 of FIG. 6B, it is determined whether the upstream network device supports ECMP. In some embodiments, the networking device is provided with this information by the controller. If the upstream network device handles ECMP, the packet would have been sent by the upstream network device due to load balancing. Accordingly, the packet is processed by this device locally at 624. In other words, the packet is passed on to the TCP layer, the network service is applied to the packet, and the serviced packet is then sent to the network application. A flow entry is generated based on the 5-tuple information and identification information of this device, and stored at 625.

If the packet belongs to a new flow but the upstream network device does not handle ECMP, then the device needs to determine whether it is a primary device or a secondary device, at 626. As discussed above, the device is informed of its role status (i.e., whether the device is primary or secondary) by the controller. If the device is a primary device, then it performs load balancing at 628. In some embodiments, load balancing includes selecting a device among the active devices to handle the packet based on a load balancing technique, replacing the destination MAC address with the MAC address of the selected device, and sending the packet to the selected device using an appropriate TCP/IP call. At 630, a flow entry is generated based on the packet's 5-tuple information and the selected device, and added to the dispatch table. If the device is a secondary device, then it will process the packet at 632, including passing the packet to the device's TCP/IP layer, applying the network service to the packet, and sending the packet to the network application using an appropriate TCP/IP call. At 634, a flow entry is generated based on the packet's 5-tuple information and its own identification information, and added to the dispatch table at 634.

Scaling of network service capacity has been described. The technique allows existing connections to be maintained, efficiently distributes traffic flows, and keeps the scaling process transparent to the client devices.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A controller for scaling service capacity, comprising: one or more processors configured to:
    in a network with at least a first device already configured to provide a network service to a network application, configure at least a second device to provide the network service to the network application, wherein the network application is associated with a virtual Internet Protocol (IP) address; and
    configure an upstream network device, including to configure a plurality of equal-cost paths directed from the upstream network device to reach the virtual IP address associated with the network application, wherein:
    the plurality of equal-cost paths comprises: a first equal-cost path directed from the upstream network device to reach the virtual IP address associated with the network application via a first interface of the first device, the first device being configured to provide the network service to the network application, and a second equal-cost path directed from the upstream network device to reach the same virtual IP address associated with the network application via a second interface of the second device, the second device being configured to provide the network service to the network application, and the first interface and the second interface being configured to be associated with different IP addresses than the virtual IP address associated with the network application;
    the first device, the second device, and the upstream network device are separate devices; and
    the upstream network device supports Equal-Cost Multi-Path (ECMP) routing; and
    one or more memories coupled to the one or more processors, configured to provide the one or more processors with instructions.

2. The controller of claim 1, wherein to configure the upstream network device further includes to configure the upstream network device to load balance flows destined for the network application among a plurality of devices including the first device and the second device.

3. The controller of claim 1, wherein the configuration of the upstream network device is performed programmatically.

4. The controller of claim 1, wherein to configure the upstream network device includes to instruct the upstream network device to add at least some of the plurality of equal-cost paths to a routing table.

5. The controller of claim 1, wherein a path among the plurality of equal-cost paths has as a next hop a network interface of a device among a plurality of devices including the first device and the second device.

6. The controller of claim 1, wherein the one or more processors are further configured to:
    perform a scale-down capacity adjustment for the network service, including to: remove a path associated with a device to be scaled down, the device being scaled down being among a plurality of devices including the first device and the second device; and
    instruct the device to be scaled down to stop providing the network service to the network application.

7. The controller of claim 1, wherein instances of the network application are operable on the first device and/or on the second device.

8. A method for scaling service capacity, comprising:
    in a network with at least a first device already configured to provide a network service to a network application, configuring, using one or more computer processors, at least a second device to provide the network service to the network application, wherein the network application is associated with a virtual Internet Protocol (IP) address; and
    configuring an upstream network device, including configuring a plurality of equal-cost paths directed from the upstream network device to reach the virtual IP address associated with the network application, wherein:

the plurality of equal-cost paths comprises: a first equal-cost path directed from the upstream network device to reach the virtual IP address associated with the network application via a first interface of the first device, the first device being configured to provide the network service to the network application, and a second equal-cost path directed from the upstream network device to reach the same virtual IP address associated with the network application via a second interface of the second device, the second device being configured to provide the network service to the network application, and the first interface and the second interface being configured to be associated with different IP addresses than the virtual IP address associated with the network application;

the first device, the second device, and the upstream network device are separate devices; and the upstream network device supports Equal-Cost Multi-Path (ECMP) routing.

9. The method of claim 8, wherein the configuring of the upstream network device further includes configuring the upstream network device to load balance flows destined for the network application among a plurality of devices including the first device and the second device.

10. The method of claim 8, wherein the configuring of the upstream network device is performed programmatically.

11. The method of claim 8, wherein the configuring of the upstream network device includes instructing the upstream network device to add at least some of the plurality of equal-cost paths to a routing table.

12. The method of claim 8, wherein a path among the plurality of equal-cost paths has as a next hop a network interface of a device among a plurality of devices including the first device and the second device.

13. The method of claim 8, further comprising:
performing a scale-down capacity adjustment for the network service, comprising:
removing a path associated with a device to be scaled down, the device being scaled down being among the plurality of devices including the first device and the second device; and
instructing the device to be scaled down to stop providing the network service to the network application.

14. A computer program product for scaling service capacity, the computer program product being embodied in a tangible non-transitory computer readable storage medium and comprising computer instructions for:
in a network with at least a first device already configured to provide a network service to a network application, configuring at least a second device to provide the network service to the network application, wherein the network application is associated with a virtual Internet Protocol (IP) address; and
configuring an upstream network device, including configuring a plurality of equal-cost paths directed from the upstream network device to reach the virtual IP address associated with the network application, wherein:
the plurality of equal-cost paths comprising: a first equal-cost path directed from the upstream network device to reach the virtual IP address associated with the network application via a first interface of the first device, the first device being configured to provide the network service to the network application, and a second equal-cost path directed from the upstream network device to reach the same virtual IP address associated with the network application via a second interface of the second device, the second device being configured to provide the network service to the network application, and the first interface and the second interface being configured to be associated with different IP addresses than the virtual IP address associated with the network application;

the first device, the second device, and the upstream network device are separate devices; and the upstream network device supports Equal-Cost Multi-Path (ECMP) routing.

15. A controller for scaling service capacity, comprising:
one or more processors configured to:
in a network with at least a primary device already configured to provide a network service to a network application, configure one or more secondary devices to provide the network service to the network application and not to respond to an Address Resolution Protocol (ARP) request associated with an Internet Protocol (IP) address of the network application such that only the primary device responds to the ARP request associated with the IP address of the network application, the configuration of the one or more secondary devices including sending configuration information to the one or more secondary devices, the configuration information instructing the one or more secondary devices not to respond to the ARP request associated with the IP address of the network application; and
instruct the primary device to perform load balancing on network traffic destined for the network application, the network traffic being load balanced among a plurality of devices, including the primary device and the one or more secondary devices; and
one or more memories coupled to the one or more processors, configured to provide the one or more processors with instructions.

16. The controller of claim 15, wherein the network traffic destined for the network application is received from an upstream network device that does not support Equal-Cost Multi-Path (ECMP) routing.

17. The controller of claim 15, wherein to configure the one or more secondary devices to provide the network service includes to send the configuration information according to a proprietary protocol.

18. The controller of claim 15, wherein to configure the one or more secondary devices to provide the network service includes to send the configuration information that includes an instruction to launch the network service.

19. The controller of claim 15, wherein the one or more processors are further configured to inform the primary device and the one or more secondary devices of their primary/secondary status.

20. The controller of claim 15, wherein the one or more processors are further configured to perform a scale-down capacity adjustment to the network service, including to:
instruct the primary device not to send any new flow to a scaled-down secondary device among the one or more secondary devices; and
instruct the scaled-down secondary device to remove the network service upon determining that existing flows handled by the scaled-down secondary device are completed.

21. A method of scaling service capacity, comprising:
in a network with at least a primary device already configured to provide a network service to a network application, configuring, using one or more computer processors, one or more secondary devices to provide the network service to the network application and not to respond to an Address Resolution Protocol (ARP) request associated with an Internet Protocol (IP) address of the network application such that only the primary device responds to the ARP request associated with the IP address of the network application, the configuration of the one or more secondary devices including sending configuration information to the one or more secondary devices, the configuration information instructing the one or more secondary devices not to respond to the ARP request associated with the IP address of the network application; and instruct the primary device to perform load balancing on network traffic destined for the network application, the network traffic being load balanced among a plurality of devices, including the primary device and the one or more secondary devices.

22. The method of claim 21, wherein the network traffic destined for the network application is received from an upstream network device that does not support Equal-Cost Multi-Path (ECMP) routing.

23. The method of claim 21, wherein configuring the one or more secondary devices to provide the network service includes to send the configuration information according to a proprietary protocol.

24. The method of claim 21, wherein configuring the one or more secondary devices to provide the network service includes to send the configuration information that includes an instruction to launch the network service.

25. The method of claim 21, further comprising informing the primary device and the one or more secondary devices of their primary/secondary status.

26. The method of claim 21, further comprising performing a scale-down capacity adjustment to the network service, comprising:
    instructing the primary device not to send any new flow to a scaled-down secondary device among the one or more secondary devices; and
    instructing the scaled-down secondary device to remove the network service upon determining that existing flows handled by the scaled-down secondary device are completed.

27. A computer program product for scaling service capacity, the computer program product being embodied in a tangible non-transitory computer readable storage medium and comprising computer instructions for:
    in a network with at least a primary device already configured to provide a network service to a network application, configuring one or more secondary devices to provide the network service to the network application and not to respond to an Address Resolution Protocol (ARP) request associated with an Internet Protocol (IP) address of the network application such that only the primary device responds to the ARP request associated with the IP address of the network application, the configuration of the one or more secondary devices including sending configuration information to the one or more secondary devices, the configuration information instructing the one or more secondary devices not to respond to the ARP request associated with the IP address of the network application; and
    instruct the primary device to perform load balancing on network traffic destined for the network application, the network traffic being load balanced among a plurality of devices, including the primary device and the one or more secondary devices.

28. A device comprising:
    a network interface configured to receive a packet that is destined for a network application; and
    one or more processors configured to:
        determine whether the packet is associated with a new flow;
        determine whether an upstream network device supports Equal-Cost Multi-Path (ECMP);
        in response to a determination that the packet is associated with a new flow and that an upstream network device used to forward the packet supports Equal-Cost Multi-Path (ECMP), process the packet locally at the device, including applying a network service to the packet and forwarding the serviced packet to the network application; and
        in response to a determination that the packet is associated with a new flow and that the upstream network device used to forward the packet does not support ECMP:
            obtain status information indicating whether the device is configured as a primary device that performs load balancing on new flows, or as a secondary device that does not perform load balancing, the obtained status information being separate from the packet that is destined for a network application; and
            load balance the packet among the plurality of devices if the status information indicates that the device is configured as a primary device, or process the packet locally at the device if the status information specifies that the device is configured as a secondary device that does not load balance the packet; wherein
    the plurality of devices are each configured to provide the network service to packets destined for the network application.

29. The device of claim 28, wherein the one or more processors are further configured to:
    in response to a determination that the packet is not associated with a new flow, look up a flow entry in a flow information store based on flow information determined based on the packet.

30. The device of claim 28, wherein the one or more processors are further configured to:
    in response to a determination that the packet is not associated with a new flow, look up a flow entry in a flow information store based on flow information determined based on the packet;
    in response to a determination that the flow entry is found, determine whether a flow associated with the packet is handled by the device;
    in response to a determination that the flow associated with the packet is handled by the device, process the packet; and
    in response to a determination that the flow associated with the packet is handled by another flow-handling device, forward the packet to the other flow-handling device.

31. The device of claim 28, wherein the one or more processors are further configured to:
    in response to a determination that the packet is not associated with a new flow, look up a flow entry in a flow information store based on flow information determined based on the packet;

in response to a determination that the flow entry is not found, determine whether there is a flow-handling device configured to handle a flow associated with the packet; and in response to a determination that there is the flow-handling device configured to handle the flow associated with the packet, replace a destination MAC address of the packet with a MAC address of the flow-handling device and cause the packet to be sent to the flow-handling device.

32. A method comprising:

receiving a packet that is destined for a network application;

determining whether the packet is associated with a new flow;

determining whether an upstream network device supports Equal-Cost Multi-Path (ECMP);

in response to a determination that the packet is associated with a new flow and that an upstream network device used to forward the packet supports Equal-Cost Multi-Path (ECMP), processing the packet locally, including applying a network service to the packet and forwarding the serviced packet to the network application; and in response to a determination that the packet is associated with a new flow and that the upstream network device used to forward the packet does not support ECMP:

obtaining status information indicating whether a device is configured as a primary device that performs load balancing on new flows, or as a secondary device that does not perform load balancing, the obtained status information being separate from the packet that is destined for a network application; and load balancing the packet among the plurality of devices if the status information indicates that the device is a primary device, or processing the packet locally at the device if the status information indicates that the device is a secondary device that does not load balance the packet; wherein the plurality of devices are each configured to provide the network service to packets destined for the network application.

33. A computer program product being embodied in a tangible non-transitory computer readable storage medium and comprising computer instructions for:

receiving a packet that is destined for a network application;

determining whether the packet is associated with a new flow;

determining whether an upstream network device supports Equal-Cost Multi-Path (ECMP);

in response to a determination that the packet is associated with a new flow and that an upstream network device used to forward the packet supports Equal-Cost Multi-Path (ECMP), processing the packet locally at the device, including applying a network service to the packet and forwarding the serviced packet to the network application; and in response to a determination that the packet is associated with a new flow and that the upstream network device used to forward the packet does not support ECMP:

obtain status information indicating whether a device is configured as a primary device that performs load balancing on new flows, or as a secondary device that does not perform load balancing, the obtained status information being separate from the packet that is destined for a network application; and load balancing the packet among the plurality of devices if the status information indicates that the device is a primary device, or processing the packet locally at the device if the status information indicates that the device is a secondary device that does not load balance the packet; wherein the plurality of devices are each configured to provide the network service to packets destined for the network application.

\* \* \* \* \*